Figure 1:
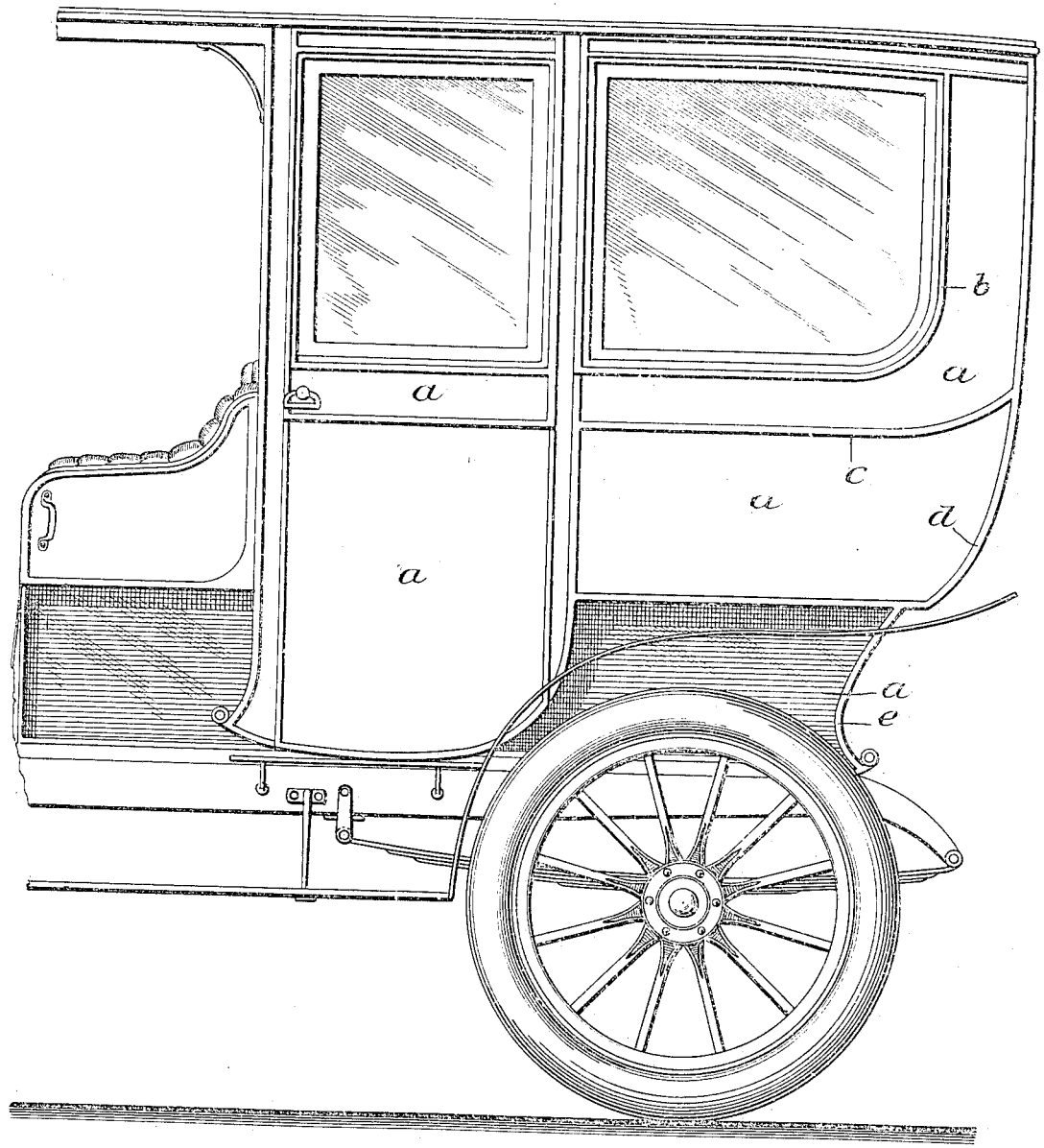

No. 818,846. PATENTED APR. 24, 1906.
W. W. OGDEN & W. C. YELTON.
VEHICLE BODY.
APPLICATION FILED OCT. 18, 1905.

2 SHEETS—SHEET 1.

WITNESSES:
Geo. W. Naylor.
O. E. Fay.

INVENTORS
William W. Ogden
Walter C. Yelton
BY
ATTORNEYS

No. 818,846. PATENTED APR. 24, 1906.
W. W. OGDEN & W. C. YELTON.
VEHICLE BODY.
APPLICATION FILED OCT. 18, 1905.

2 SHEETS—SHEET 2.

WITNESSES:
Geo. W. Naylor
A. E. Fay

INVENTORS
William W. Ogden
Walter C. Yelton
BY
ATTORNEYS

UNITED STATES PATENT OFFICE.

WILLIAM W. OGDEN, OF CHATHAM, AND WALTER C. YELTON, OF NEWARK, NEW JERSEY, ASSIGNORS TO J. M. QUINBY & CO., OF NEWARK, NEW JERSEY.

VEHICLE-BODY.

No. 818,846.     Specification of Letters Patent.     Patented April 24, 1906.

Application filed October 18, 1905. Serial No. 283,241.

*To all whom it may concern:*

Be it known that we, WILLIAM W. OGDEN, a resident of Chatham, in the county of Morris, and WALTER C. YELTON, a resident of Newark, in the county of Essex, State of New Jersey, citizens of the United States, have invented a new and Improved Vehicle-Body, of which the following is a full, clear, and exact description.

With the recent advances in the art of making carriage, automobile, and other vehicle bodies several new problems have arisen. The use of sheet-metal plates for the panels has rendered necessary certain departures from the long-established customs. The devices, however, which have heretofore been resorted to for the purpose of securing aluminium and other metal plates to the frame have not been entirely satisfactory. One of the most approved ways of joining the edges of these plates is by the use of a flat strip to cover the joint held by screws extending through it from the outside. This strip is flexible and gives little, if any, additional support to the plates. It is slightly bent or buckled where the screws are passed through it, and when they are tightened the screw-heads present an uneven surface, which it is almost impossible to entirely conceal by dressing. The strips, therefore, are uneven from the buckling and have indentations which, even if they do not show when the surface is first finished, will always present an unsightly appearance after any considerable use. These structures are also not entirely water-tight, and it is well known that if a drop of water enters between one of these strips and the panel it will establish a way for the entrance of additional moisture and will result in a rotted frame at a point which may be concealed from view, and consequently the damage may be very extensive before it is discovered.

The principal objects of our invention are to provide a new means for joining either aluminium, steel, copper, or any other metal panels together and to the wooden frames of vehicle-bodies in such a way as to obviate all of these objections—in other words, to provide an absolutely waterproof shell, add to the stiffness and rigidity of the structure, and to afford an absolutely smooth and uniform outer surface for the shell and for the adjoining strip. These objects we accomplish by certain simple improvements in the frame and joint-strip, which so coöperate with each other as to accomplish the desired result.

Reference is to be had to the accompanying drawings, forming a part of this specification, in which similar characters of reference indicate corresponding parts in all the figures.

Figure 2:
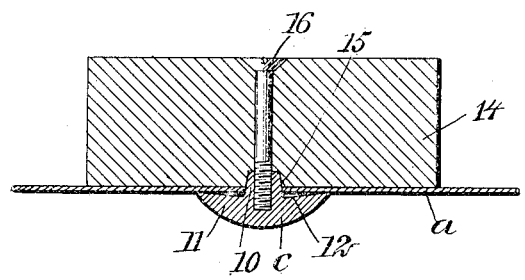
Figure 3:
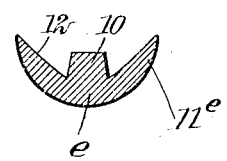
Figure 4:
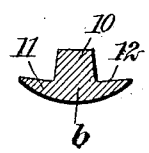
Figure 5:
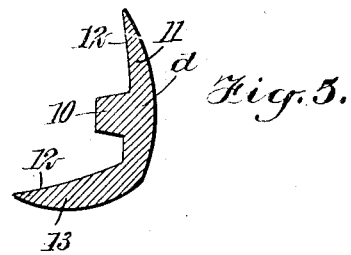

Figure 1 is a side view of a part of an automobile-body, showing how our invention is applied. Fig. 2 is a transverse sectional view of a portion of the frame, on an enlarged scale; and Figs. 3, 4, and 5 are transverse sectional views of three different forms of covering-strips for the joints, all coming within the scope of our invention.

As shown in Fig. 1, in which we have for convenience illustrated a portion of an automobile-body, there are a number of panels $a$, formed of aluminium, steel, copper, or other sheet metal. These panels are joined at their edges by means of joint-strips $b$, $c$, $d$, and $e$, which in the particular form of vehicle shown assume several different shapes. These strips, while of different shapes and cross-sections, all follow one general principle, as they are each made with a projection 10, extending centrally to the rear from the body of the strip. They are also each provided with flanges 11, extending to the right and left from the central rear projection. These flanges are of different forms in the different styles of strips, according to the position which they are to occupy. In the strip $b$ they extend substantially at right angles to the projection, but are slightly concaved on the surface 12 for a purpose to be described. In the strip $c$, which is substantially like $b$, except for size, the same conditions apply. In the strip $d$ the same thing is true upon one side; but on the other side there is an additional projection 13, extending at an obtuse angle from the main body of the strip. This is provided for the purpose of protecting the corner of the body. In the strip $e$, which is also a corner-strip, the two projections $11^e$, extending from the main body, are substantially at right angles to each other, but concaved, so as to form a tight joint. This strip is designed, as shown in Fig. 1, to be placed directly on a corner of the body.

The body is provided with a frame consisting of wooden members 14. Each of these wooden members is provided with a longitudinal groove 15, preferably located in the center of its face and of such form as to receive the projections 10. When the parts are assembled, the panels *a* are placed on the wooden frame with their edges flush with the edges of the groove 15. Then the proper strip is placed in position and screws 16 applied through the wooden frame from the rear to enter the strip and securely hold it in position. By constructing the device in this manner it will be seen that the projection on the rear of the strip acts as a strengthening-rib in addition to the fact that it projects into the groove in the frame so as to rigidly hold the strip against flexion. Also it forms an abutment against which the edges of the sheet-metal plates rest and limits their position in this respect. It also securely holds them on account of this fact. Moreover, the rib is of such form as to prevent the flexion or buckling of the strip when the screws are applied, and the groove in the frame assists in holding all the parts in rigid position. It will be seen that the concave surface 12 permits the edges of the strip to rest tightly on the surfaces of the panels, and thus assists in providing for an absolutely tight joint.

Bodies of carriages, automobiles, and other vehicles constructed in this manner are provided with a joint which is perfectly stiff, affording means for securing the strip firmly in position without bending it in any observable degree or presenting any irregularity upon its outer surface. It also affords a perfectly water-tight joint, and a molding is secured which cannot possibly get out of true and which presents a perfectly smooth surface that is easily dressed and that will not show anything except a smooth exterior when subjected to wear. The moldings are constructed of various sizes and shapes, according to the joints which they are to cover. When they are in place, the joints where they intersect each other are soldered or brazed, so that the whole exterior of the shell presents a metal surface without any exterior fastening whatever. This insures a great increase in durability, because absolutely no water can reach the interior wood frame.

Having thus described our invention, we claim as new and desire to secure by Letters Patent—

1. A vehicle-body having a wooden frame, a metal shell, said shell consisting of a plurality of separated panels and the frame comprising elements located behind the joints between the panels and having grooves corresponding with said joints, and a molding or strip located on the outside of each joint and projecting into the groove in a corresponding part of the frame.

2. A vehicle-body having a wooden frame, a shell consisting of a plurality of sheet-metal panels, the frame comprising elements located behind the joints between the panels and having grooves corresponding with said joints, the edges of the grooves being flush with the edges of said plates, and a metal molding having a concave inner surface located on the outside of each joint and projecting into the groove in the frame.

3. A vehicle-body having a wooden frame, a metal shell, said shell consisting of a plurality of separated panels and the frame comprising elements located behind the joints between the panels and having grooves corresponding with said joints, and a molding or strip located on the outside of each joint; said molding being provided with a longitudinal projection engaging the edges of the plates and fitting in the grooves, and means extending from the back of the frame for securing the molding to the frame.

4. A vehicle-body having a wooden frame, a metal shell, said shell consisting of a plurality of separated panels and the frame comprising elements located behind the joints between the panels and having grooves corresponding with said joints, and a molding or strip located on the outside of each joint; the molding having a longitudinal projection extending into the groove in the frame, flanges adapted to clamp the panels between the molding and frame, and screws passing through the wooden frame and into said projections for holding the molding firmly in position.

5. A molding for covering joints between the panels of a vehicle, comprising a metal plate having a concave under side, a longitudinal projection extending from the inner portion of said concavity at right angles to the body of the plate, the concave surface extending from the projection in substantially opposite directions and another projection extending from one side of the plate at an obtuse angle to the main body thereof.

In testimony whereof we have signed our names to this specification in the presence of two subscribing witnesses.

WM. W. OGDEN.
WALTER C. YELTON.

Witnesses:
HENRY D. OGDEN,
HERBERT STRONG.